F. P. LARSON.
TIRE CHAIN.
APPLICATION FILED JAN. 15, 1913.
1,069,885. Patented Aug. 12, 1913.
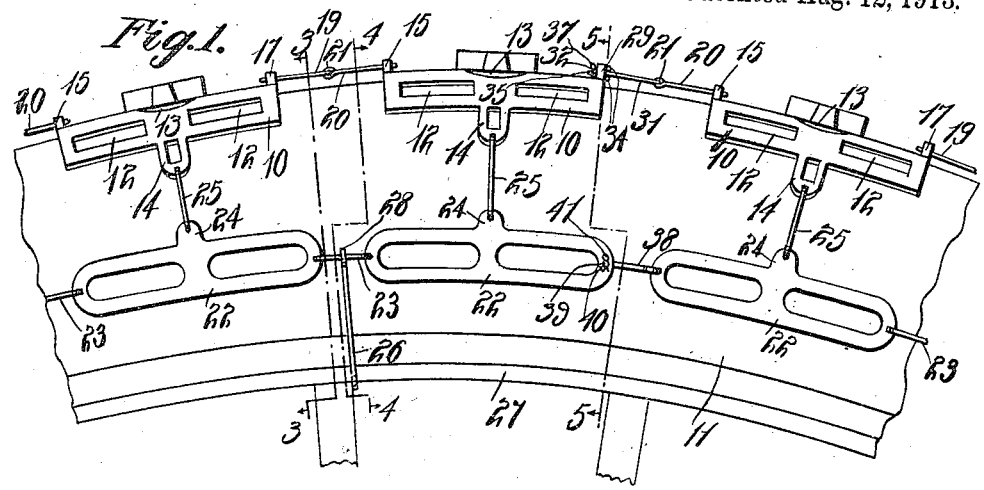
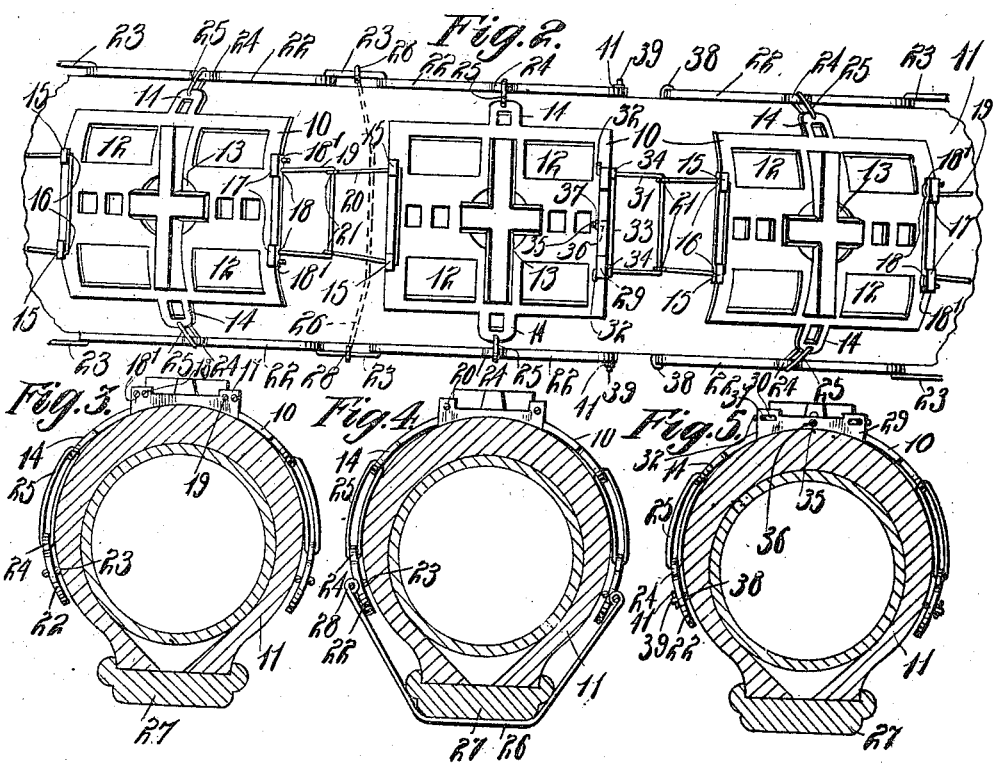
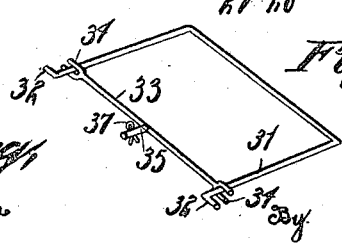
Witnesses
Inventor
F. P. Larson,
Attorneys

UNITED STATES PATENT OFFICE.

FRANK P. LARSON, OF PLAINVIEW, NEBRASKA.

TIRE-CHAIN.

1,069,885.

Specification of Letters Patent. Patented Aug. 12, 1913.

Application filed January 15, 1913. Serial No. 742,206.

*To all whom it may concern:*

Be it known that I, FRANK P. LARSON, a citizen of the United States, residing at Plainview, in the county of Pierce, State of Nebraska, have invented certain new and useful Improvements in Tire-Chains; and I do hereby declare the following to be a full, clear, and exact description of the invention, such as will enable others skilled in the art to which it appertains to make and use the same.

This invention relates to tire chains and has for an object to provide an extremely simple and inexpensive tire chain which may be easily applied and removed and when applied will positively prevent the wheel skidding on icy or slippery roadbeds.

With the above objects in view the invention consists of certain novel details of construction and combination of parts hereinafter fully described and claimed, it being understood that various modifications may be made in the minor details of construction within the scope of the appended claims.

In the accompanying drawing illustrating the invention:—Figure 1 is a fragmentary side elevation. Fig. 2 is a fragmentary plan. Fig. 3 is a cross section taken on the line 3—3 Fig. 1. Fig. 4 is a cross section taken on the line 4—4 Fig. 1. Fig. 5 is a cross section taken on the line 5—5 Fig. 1. Fig. 6 is a detail perspective view of the tie member.

Referring now to the drawing in which like characters of reference designate similar parts, the device is shown to comprise a circular series of sheet metal plates 10 adapted to extend around the tread of the tire 11, each plate being oblong in outline and being formed with a plurality of perforations 12 and a projection 13. Each plate is provided on the side edges with centrally disposed curved ears 14. Each end of each plate is equipped with a pair of upstanding perforated lugs, the lugs 15 at one end being each provided with single perforations 16, and the lugs 17 at the opposite end being each provided with a pair of perforations 18 and 18′.

For connecting the confronting ends of each two adjacent plates, a yoke 19 has the legs terminally passed through the inner pair of perforations 18 of the lugs 17 of one plate and then bent back and passed through the outer pair of the perforations 18′ of the said lugs. A second yoke 20 is passed through the perforations 16 of the lugs 15 of the adjacent plate until the bight of the yoke engages with the lugs, the legs of the yoke being terminally equipped with eyes 21 which encircle the bight of the first named yoke 19.

On each side of the series of plates 10 is arranged a chain ring comprising a plurality of links 22 preferably stamped from sheet metal, the confronting ends of adjacent rings being connected by wire loops 23. The links are the same in number as the plates 10 and each link is provided on one edge with a perforated lug 24. A wire loop 25 is passed through the perforation of this lug and through a perforation in the corresponding ear 14 of the related plate 10.

For securing the chain rings to the sides of the tire and preventing escape of the device when the tire is deflated, a plurality of U-shaped members 26 formed of stiff wire are placed astride of the felly 27 and are terminally equipped with eyes 28 which interlock with corresponding wire loops 23 of both the chain rings.

For detachably securing together the terminal plates of the series of plates 10, one of the terminal plates is formed at one end with an upturned flange 29 instead of the usual lugs 17, and near the ends of the flange are formed slots 30. A spring wire yoke 31 is substituted for the usual yoke 19, this yoke being equipped with terminal hooks 32 which are passed through the slots 30 by forcing the legs of the yoke toward each other, the hooks engaging on the rear side of the flange 29 when the legs are released. A spreader rod 33 is provided terminally with forks 34 which straddle the legs of the yoke near the flange and hold the legs spread apart, thereby preventing accidental withdrawal of the yoke from the flange. The spreader rod is centrally provided with a perforated lug 35 which is passed through an opening 36 in the flange, a cotter pin 37 being then passed through the lug to secure the rod to the flange.

For detachably securing together the terminal links of the chain rings, one of the terminal links is equipped with a bar 38 having a hooked extremity 39 which is passed through an opening 40 in the other terminal link, the hook being terminally perforated to receive a cotter pin 40 which prevents accidental withdrawal of the bar from operative position.

From the above description it will be seen that the device may be readily removed by withdrawing the cotter pins of the chain rings and cotter pins of the series of plates. Furthermore, it will be seen that the device produces a flexible armor which is light in weight and which will serve to effectively prevent skidding of the tire on slippery roadbeds.

What is claimed, is:—

1. In a tire armor, a circular series of sheet metal plates each having a pair of perforated lugs at each end, and means for connecting the confronting ends of adjacent plates comprising a yoke having the legs terminally engaged in the perforations of the lugs at the end of one plate, and a second yoke having the legs passed through the openings of the terminal lugs of the adjacent plate with the bight bearing against said terminal lugs and the legs having terminal eyes encircling the bight of the first named yoke.

2. In a tire armor, a circular series of sheet metal plates each having a pair of lugs at one end, each lug having a single opening, said plate further having a pair of lugs at the opposite end each having a pair of openings, and means for connecting the confronting ends of adjacent plates comprising a yoke having the legs passed through the inner pair of openings of the last named lugs of one plate and then bent back and passed through the outer pair of openings of said lugs, and a second yoke passed through the openings of the first named lugs of the adjacent plate with the bight bearing against said lugs and the lugs having terminal eyes encircling the bight of the first named yoke.

3. In a tire armor, a series of sheet metal plates pivotally connected together, and means for removably connecting the terminal plates of said series comprising a spring wire yoke pivotally connected to one of said terminal plates and having the legs terminating in hooks, a flange formed on the end of the other of said terminal plates having slots near the ends adapted to receive said hooks, a spreader bar having notched ends placed astride of the legs of said yoke and holding said yoke against withdrawal from said flange, and interlocking means between said spreader bar and said flange.

In testimony whereof, I affix my signature, in the presence of two witnesses.

FRANK P. LARSON.

Witnesses:
LARS PETERSEN,
JAMES M. LARSON.

Copies of this patent may be obtained for five cents each, by addressing the "Commissioner of Patents, Washington, D. C."